United States Patent
Kohno et al.

(10) Patent No.: US 6,459,409 B1
(45) Date of Patent: Oct. 1, 2002

(54) METHOD AND DEVICE FOR USING ARRAY ANTENNA TO ESTIMATE LOCATION OF SOURCE IN NEAR FIELD

(75) Inventors: Ryuji Kohno, Tokyo (JP); Abreu Giuseppe, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/858,371

(22) Filed: May 16, 2001

(30) Foreign Application Priority Data

May 18, 2000 (JP) ......................................... 2000-146155

(51) Int. Cl.[7] ............................. G01S 5/02; G01S 3/02
(52) U.S. Cl. ....................................... 342/423; 342/450
(58) Field of Search .................................. 342/423, 424, 342/445, 146, 450

(56) References Cited

PUBLICATIONS

Improving the performance of AR estimation of near–field signal sources by decimation, A. Moghaddar et al., IEEE International Conference on Systems Engineering, pp. 395–398, 1991.*

Object detection using high resolution near–field array processing, A. Sahin et al., IEEE Transactions on Geoscience and Remote Sensing, vol. 39(1), pp. 136–141, Jan. 2001.*

* cited by examiner

*Primary Examiner*—Thomas H. Tarcza
*Assistant Examiner*—Fred H Mull
(74) *Attorney, Agent, or Firm*—Frommer Lawrence & Haug LLP; William S. Frommer

(57) ABSTRACT

An array antenna includes two sub-arrays. Each sub-array has at least three elements with at least one unshared element. Samplers sample elements separately for the sub-arrays. A direction-of-arrival estimator uses sampling from the samplers to make a separate direction-of-arrival estimate for each sub-array for direction of arrival of a signal from a source. A source location estimator estimates distances from the source to each element based on the separate direction-of-arrival estimates from the direction-of-arrival estimator. A sampling adjuster adjusts timing of sampling performed by the samplers based on the distances from the source location estimator.

6 Claims, 8 Drawing Sheets

METHOD AND DEVICE FOR USING ARRAY ANTENNA TO ESTIMATE LOCATION OF SOURCE IN NEAR FIELD

BACKGROUND OF THE INVENTION

1. Field of the Invention

The present invention relates to method and device that uses an array antenna to locate the near-field source of a signal that falls incident on the array antenna.

2. Description of the Related Art

FIG. 1 shows a uniform linear array ULA with elements 0 to 6 receiving a signal from a source in the far field of the array ULA. When a transmission source is in the far field, it is assumed to be an infinite distance from the array, so that the received signal has a plane wavefront PW. Because the wavefront is plane, the incident signal has the same incident angle $\theta_{farfield}$ at each element. Direction of Arrival (DOA) estimation algorithms such as MUSIC and ESPIRIT perform DOA estimation with great accuracy when the transmission source is in the far field of the array. For example, U.S. Pat. No. No. 5,854,612 (based on foreign priority of Japanese Patent Application No. 9-042877) describes that it is a relatively easy task to obtain the angle of the incident signal by calculating the phase difference of the signal received at the different antenna elements.

However, in most indoor applications, such as Wireless LAN, the source is in the near field. As shown in FIG. 2, when the transmission source S in the near field of the reception array, propagation waves from the transmission source have a spherical wavefront SW. The arrival angle is different at each element, for example, angles $\theta_0$, $\theta_4$, and $\theta_6$ at elements 0, 4 and 6, respectively. When the above-described DOA estimation algorithms are used for near field sources, the estimate of the source location, and consequentially the radiation diagram, can be distorted.

Attempts have been made to improve results of DOA estimation performed for near field sources using far field DOA estimation algorithms. For example Kennedy et al disclose such a method in "Broadband Near field Beamforming Using a Radial Beam pattern Transformation", IEEE Trans. on Signal Proc., vol. 46, no 8, August 1998. However, this method requires a previous precise knowledge of the distance from the source to each element of the array.

Asano et al disclose another method in "Source separation using subspace method and spatial inverse filter", IEICE Technical Report, EA 99-22, pp. 1–7, June 1996. This method estimates not only DOA, but also distance to the source. However, without some general knowledge of the source's location, the distance to the source can be any value from 0 to infinity. Therefore, a range domain with essentially no bounds must be searched to find the source.

SUMMARY OF THE INVENTION

It is an objective of the present invention to overcome the above-described problems, and to provide a source location estimation device capable of estimating source location in the near field using far field DOA estimation algorithms, with only a limited domain search even when source location is completely unknown.

To achieve the above-described objective, a source location estimation device according to the present invention includes an array antenna, first and second samplers, a direction-of-arrival estimator, a source location estimator, and a sampling adjuster.

The array antenna includes two sub-arrays. Each sub-array has at least three elements with at least one uncommon element. The first sampler samples elements of one sub-array, and the second sampler samples elements of the other sub-array. The direction-of-arrival estimator uses samples from the samplers to make a separate direction-of-arrival estimate for each sub-array for direction of arrival of a signal from a source. The source location estimator estimates distances from the source to each element based on the separate direction-of-arrival estimates from the direction-of-arrival estimator. The sampling adjuster adjusts timing of sampling performed by the samplers based on the distances from the source location estimator.

With this configuration, the sampling timing of the sampler is synchronized to follow the sphericity of the incoming wavefront. The near field distortion is gradually removed with each iteration, so that the source is located with increasingly higher precision. No previous knowledge of the source location is needed, because only a simple angle-domain is searched, limited to the interval between 0 (0 degrees) and π (180 degrees).

According to another aspect of the present invention, the sampling adjuster adjusts timing of sampling by the first sampler based on the following formula:

$$\Delta\tau|_i^{\hat{\theta}_0} = \frac{(\hat{d}_i - \hat{d}_0)}{c} - \frac{i\lambda\Delta e}{c}\cos(\hat{\theta}_0)$$

wherein i represents the target element of sampling from elements 0 to Ls–1, element 0 being the optimum referential element of the one sub-array;

$\Delta\tau|_i^{\theta_0}$ represents the error between the far-field delay and the near-field delay with respect to the element 0 and the target element;

$\hat{d}_i$ represents the distance between the source and the target element estimated by the source location estimator;

$\hat{d}_0$ represents the distance between the source and the element 0 estimated by the source location estimator;

c represents the speed of light;

$\lambda\Delta e$ represents inter-element distance; and $\hat{\theta}_0$ represents direction of arrival estimated for the element 0 of the one sub-array by the direction-of-arrival estimator.

Further, the sampling adjuster adjusts timing of sampling by the second sampler based on the following formula:

$$\Delta\tau|_i^{\hat{\theta}_{L-1}} = \frac{(\hat{d}_i - \hat{d}_0)}{c} - \frac{i\lambda\Delta e}{c}\cos(\hat{\theta}_{L-1})$$

wherein i represents the target element of sampling from elements L-Ls to L-1, the element L-1 being the optimum referential element of the other sub-array;

$\Delta\tau|_i^{\theta_{L-1}}$ represents the error between the far-field delay and the near-field delay with respect to the element L-1 and the target element; and $\hat{\theta}_{L-1}$ represents the direction of arrival estimated for the element L-1 by the direction-of-arrival estimator.

With this configuration, the sampling adjuster can adjust timing of sampling for elements using a relatively simple algorithm.

According to another aspect of the present invention, the array antenna includes elements 0 to L-1 for a total of L elements. One sub-array includes elements 0 to $L_s$-1, wherein $L_s$<L. Element 0 is an optimum referential element of the one sub-array. The other sub-array is obtained by a shift of L-Ls elements, and so includes elements L-$L_s$ to L-1. The element L-1 is an optimum referential element of the other sub-array.

Further, the source location estimator estimates distances between the source and each of the elements 0 to L-1 based on the following formulas:

$$\hat{d}_0 = \frac{(L-1)\Delta e \lambda}{\left|\frac{\sin(\hat{\theta}_0)}{\sin(\hat{\theta}_{L-1})}\cos(\hat{\theta}_{L-1}) - \cos(\hat{\theta}_0)\right|}$$

and $$\hat{d}_{i>0} = \sqrt{\left(\hat{d}_0 \cos(\hat{\theta}_0) + i\Delta e\lambda\right)^2 + \left(\hat{d}_0 \sin(\hat{\theta}_0)\right)^2}$$

wherein i represents a target element of sampling from elements 0 to L-1;

$\hat{d}_0$ represents the distance between the source and the element 0 estimated by the source location estimator;

$\lambda\Delta e$ represents the inter-element distance;

$\hat{\theta}_0$ represents the direction of arrival estimated for the element 0 by the direction-of-arrival estimator:

$\hat{\theta}_{L-1}$ represents the direction of arrival estimated for the element L-1 by the direction-of-arrival estimator; and $\hat{d}_i$ represents the distance between the source and the target element estimated by the source location estimator.

With this configuration, the source location estimator can estimate distances between the source and each of the elements 0 to L-1 using a relatively simple algorithm.

According to still another aspect of the present invention, a beamformer is provided that performs beamforming based on the distances estimated by the source location estimator. The beamformer can track the movement of a mobile terminal while also steering beamforming that is performed at the mobile terminal. Both null steering and beam steering can be accurately performed.

A method according to the present invention includes the steps of sampling elements of two sub-arrays having at least three elements each, wherein at least one element of each sub-array is not shared with the other sub-array; using sampling results to make a separate direction-of-arrival estimate for each sub-array for direction of arrival of a signal from a source; estimating distances from the source to each element based on the separate direction-of-arrival estimates; and adjusting timing of sampling of the elements based on the distances.

With this method, the sampling timing of the sampler is synchronized to follow the sphericity of the incoming wavefront. The near field distortion is gradually removed with each iteration, so that the source is located with increasingly higher precision. No previous knowledge of the source location is needed, because only a simple angle-domain is searched, limited to the interval between 0 (0 degrees) and π (180 degrees).

BRIEF DESCRIPTION OF THE DRAWINGS

The above and other objects, features, and advantages of the invention will become more apparent from reading the following description of the embodiment taken in connection with the accompanying drawings in which.

DETAILED DESCRIPTION OF THE EMBODIMENT

Figure 1:
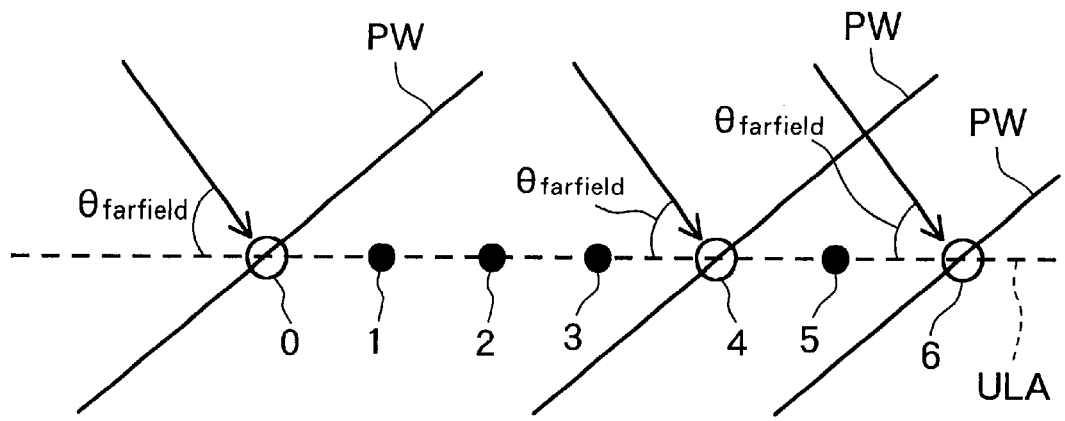
FIG. 1 is a schematic view showing an array antenna receiving signals from a source in the far field.
Figure 2:
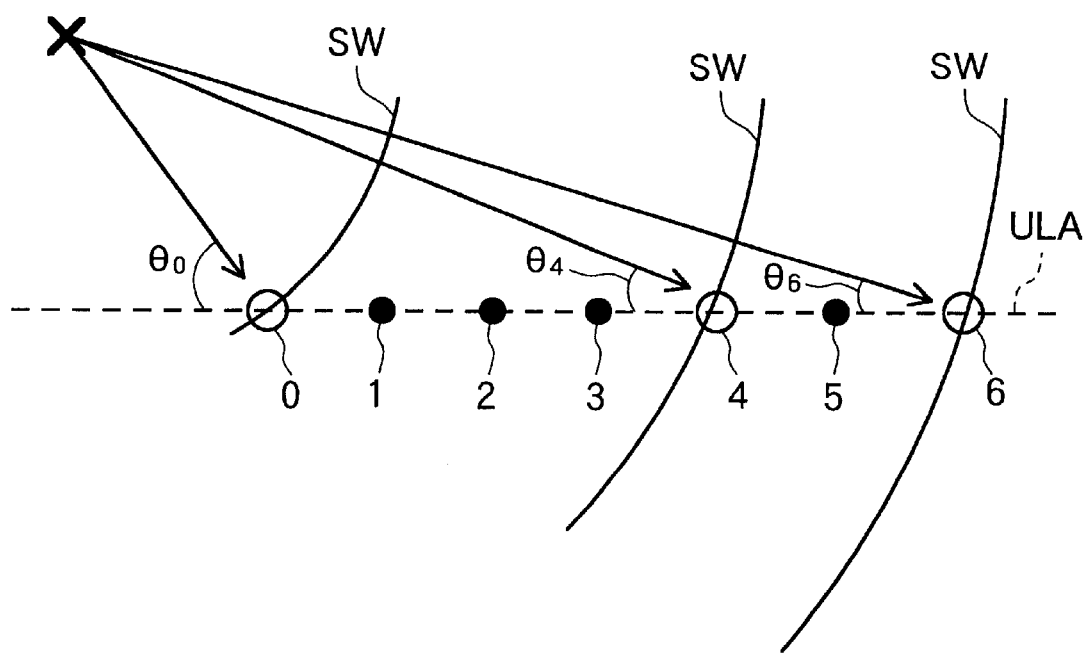
FIG. 2 is a schematic view showing the array antenna receiving signals from a source in the near field.
Figure 3:
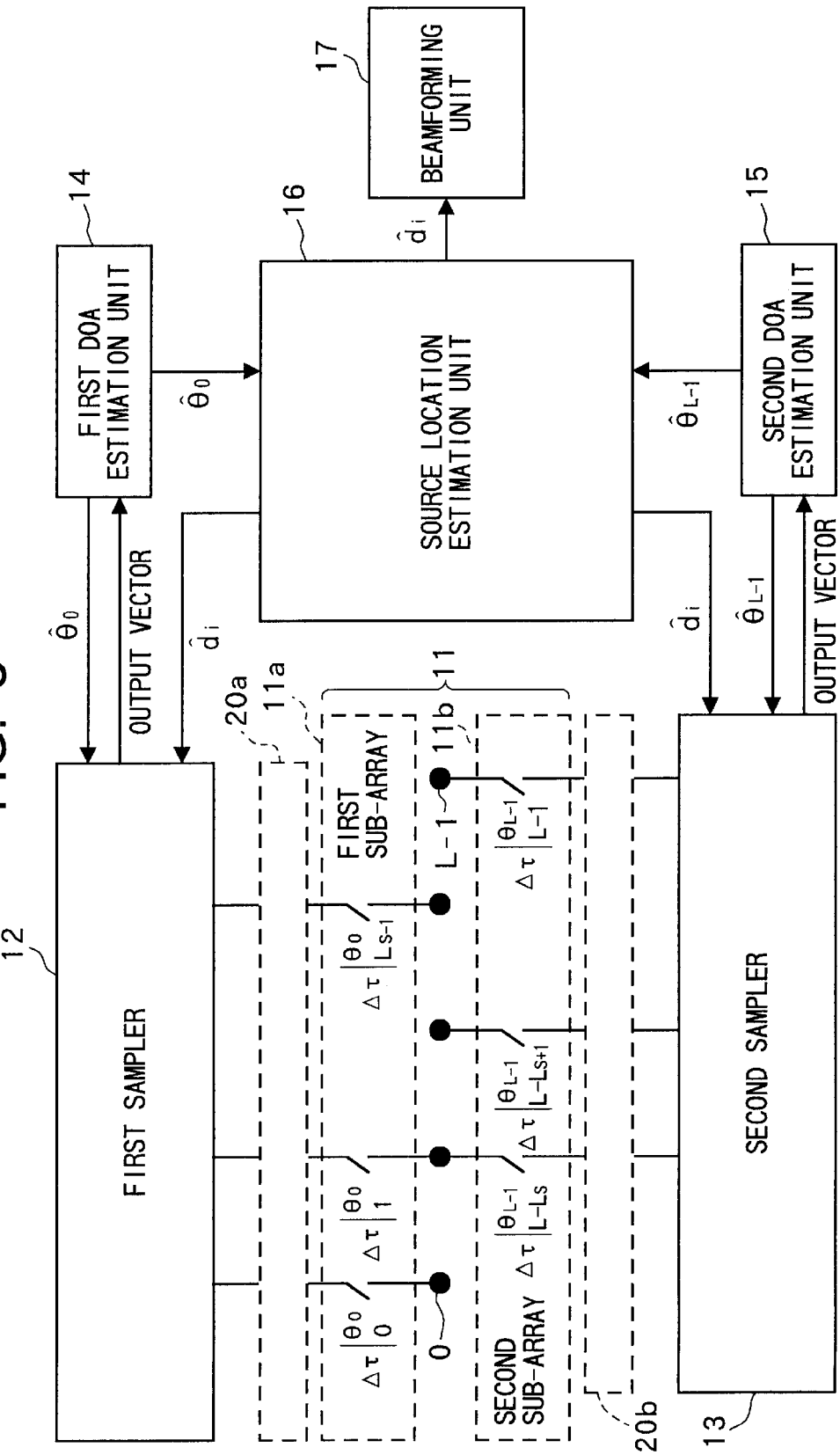
FIG. 3 is a block diagram showing essential components of a source location estimation device according to an embodiment of the present invention.

A source location estimation device according to the embodiment of the present invention will be described while referring to the accompanying drawings. As shown in FIG. 3, the source location estimation device includes an array 11, first and second samplers 12, 13, first and second DOA estimation units 14, 15, a source location estimation unit 16, and a beamforming unit 17.

Figure 4:
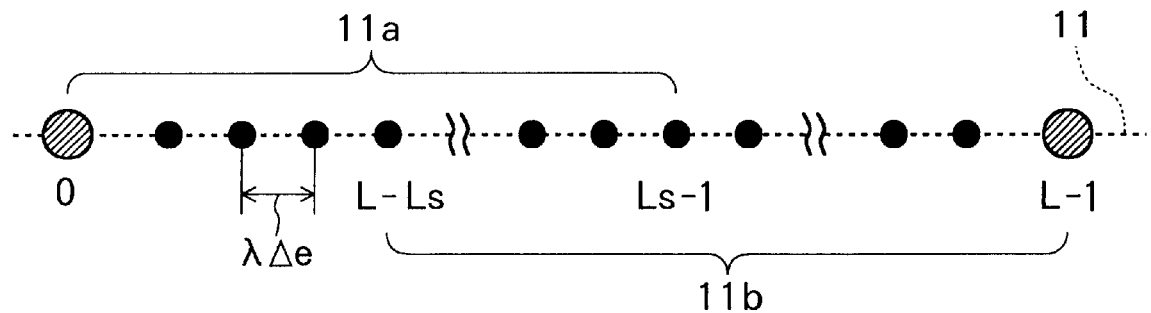
FIG. 4 is a schematic view showing an array antenna of the device of FIG. 3.

The array 11 includes elements 0 to L-1 divided into first and second sub-arrays 11a, 11b. FIG. 4 shows the array 11 in greater detail. Each sub-array includes at least three elements with inter-element spacing of $\lambda\Delta e$. The first sub-array 11a consists of elements 0 to $L_s$-1, wherein $L_s$<L. The second sub-array 11b is obtained by a shift of L-Ls elements, and so consists of elements L-$L_s$ to L-1. With this configuration, the two sub-arrays 11a, 11b are equally large and may overlap. However, each sub-array 11a, 11b will always have at least one unshared element, which is uncommon to that sub-array.

The samplers 12, 13 sample instantaneous voltage or current values at the elements of the sub-arrays 11a, 11b respectively, and output the samples as output vectors. Unlike conventional far field schemes, the sampling timing is in a non-synchronous manner. That is, in a manner to be described below, the samplers 12, 13 adjust timing of sampling according to estimated distances $\hat{d}_i$ received from the source location estimation unit 16, in order to follow the curve of the spherical wavefront under near field conditions.

The DOA estimation units 14, 15 collect the output vectors from the samplers 12, 13, respectively and perform DOA estimation. The DOA estimation units 14, 15 can use any known DOA estimation method, such as MUSIC, ESPIRIT, or any future, presently unknown DOA estimation algorithm. During DOA estimation, the DOA estimation units 14, 15 multiply each output vector by its transpose conjugate, resulting in an instantaneous matrix. The entries of the matrix are the square of voltages. Matrixes are prepared for several subsequent samples, summed to previous matrixes, and then averaged. The resultant matrix is called the output covariance matrix. The output covariance matrix includes a signal sub-matrix and a noise sub-matrix, and represents the power relations between the several elements of the sub-arrays.

The output covariance matrix is then processed in some manner, depending on the estimation algorithm used, to extract information on where energy of incoming signals comes from. For example, in the case of MUSIC, the measured covariance matrix is compared to a covariance matrix built based on a certain DOA, and the difference between the two is estimated. Then the procedure is repeated for another supposed DOA. The final result is a plot that gives a peak in the direction of the angle that best matches the true DOA. The DOA estimation units 14 and 15 output estimated angles $\hat{\theta}_0$, $\hat{\theta}_{L-1}$ accordingly to the source location estimation unit 16.

Because each sub-array 11a, 11b has at least 3 elements, if the source S is located at near field, then the DOA estimation units 14, 15 will each generate a different output covariance matrix. As a result, the angles $\hat{\theta}_0$, $\hat{\theta}_{L-1}$ from the DOA estimation units 14 and 15 will be different.

The source location estimation unit 16 uses the different angles $\hat{\theta}_0$, $\hat{\theta}_{L-1}$ from the DOA estimation units 14 and 15 to calculate the distances $\hat{d}_i$ from the source to each element of the array 11. The distances $\hat{d}_i$ are outputted to the samplers 12, 13 and the beamforming unit 17.

As mentioned previously, the samplers 12, 13 use the distances $\hat{d}_i$ from the source location estimation unit 16 to adaptively adjust the sampling clock of the elements in each sub-array to follow the sphericity of the incoming wavefront. During repeated iterations, this sampling adjustment gradually removes the near field distortion, thereby "flattening out" spherical wavefronts into plane wavefronts, so that conventional far field estimation algorithms can be successfully used when the source is in the near field. The source location estimation unit 16 estimates the source location with increasingly higher precision by repeated iterations.

The beamforming unit 17 uses the distances $\hat{d}_i$ to build a radiation diagram. As the distances $\hat{d}_i$ from the source location estimation unit 16 become more accurate, the beamforming unit 17 will have an increasingly good understanding of where the source is, so that all the elements of the array 11 can be used to beam form to the source with optimum performance.

Figure 5:
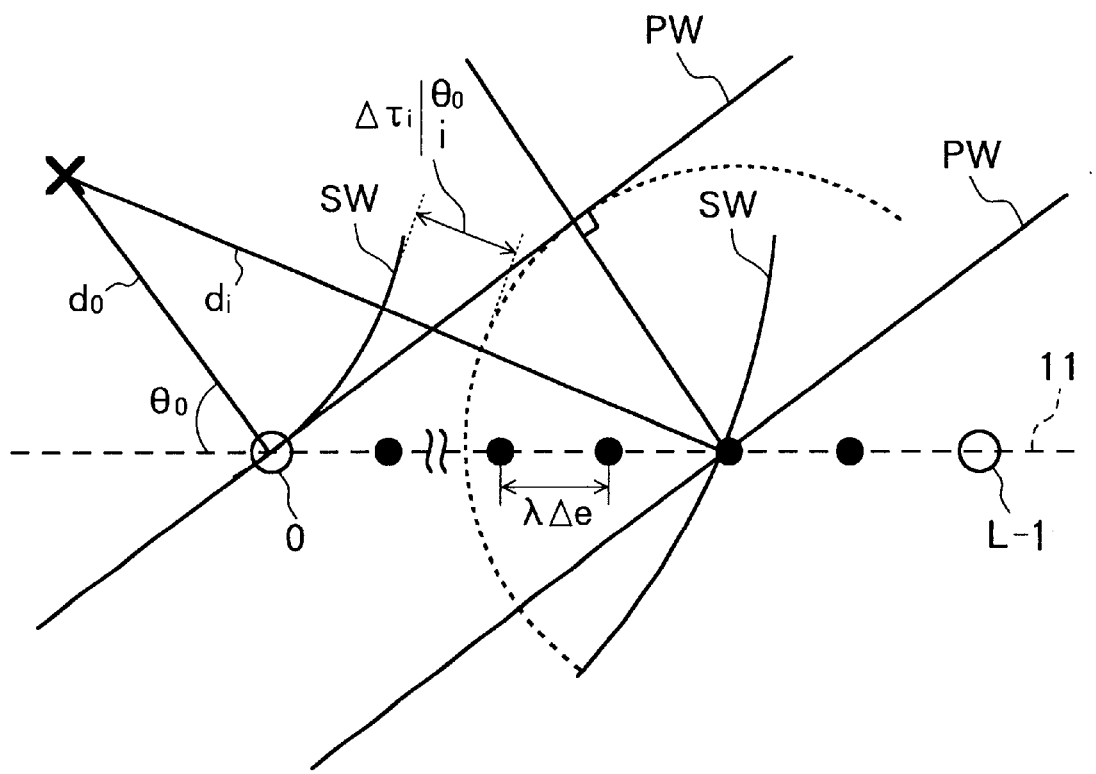
FIG. 5 is a schematic view showing the error between the far-field delay and the near-field delay with respect to an optimum reference element (0) and an arbitrary element of a first sub-array of the array antenna.
Figure 6:
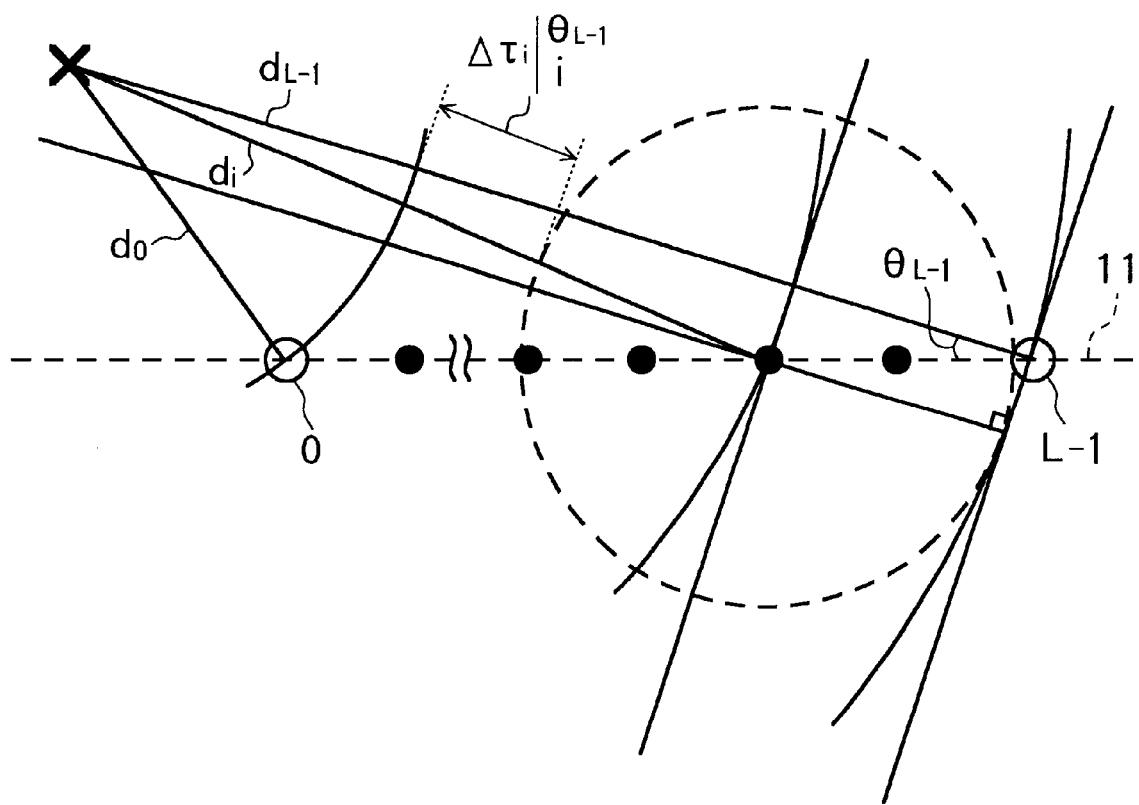
FIG. 6 is a schematic view showing the error between the far-field delay and the near-field delay with respect to an optimum reference element (L-1) and an arbitrary element of a second sub-array of the array antenna.

Next, the computations performed at the various functional blocks of FIG. 3 will be described in more detail. First, the method of computing the sampling adjustments at the samplers 12, 13 will be explained here with reference to FIGS. 5 and 6. In the situation shown in FIGS. 5 and 6, a transmission source S is located at polar coordinates $(d_0, \angle \theta_0)$, in the near field of the array 11. As mentioned previously, each sub-array 11a, 11b has at least one uncommon element, not shared with the other sub-array. This insures that if the source S is located at near field, then the set of source-to-element distances $\{d_0, d_1, \ldots, d_{Ls-1}\}$ for the first sub-array 11a will be different from the set of source-to-element distances $\{d_{L-Ls}, d_{L-Ls+1}, \ldots, d_{L-1}\}$ for the second sub-array 11b. In the example of FIGS. 5 and 6, the first element 0, an arbitrary ith element i, and the last element L-1 are separated from the source S by different distances $d_0$, $d^i$, and $d_{L-1}$, respectively.

Referring to FIG. 5, a far-field 0-to-i delay between when a plane wavefront PW reaches element 0 and when it reaches the ith element i can be estimated using the following formula:

$$\text{far-field 0-to-}i \text{ delay} = \frac{i\lambda \Delta e}{c}\cos(\hat{\theta}_0) \qquad (1)$$

wherein i represents the target element of sampling from elements 0 to L-1, elements 0 and L-1 being optimum referential elements of the sub-arrays 11a and 11b respectively;

$\lambda \Delta e$ represents inter-element distance;

c represents the speed of light; and $\hat{\theta}_0$ represents direction of arrival estimated for the element 0 by the first DOA estimation unit 14.

A near-field 0-to-i delay between when a spherical wavefront SW reaches element 0 and when it reaches the ith element i under near field conditions can be determined using the following formula:

$$\text{near-field 0-to-}i \text{ delay} = \frac{(\hat{d}_i - \hat{d}_0)}{c} \qquad (2)$$

wherein $\hat{d}_i$ represents distance between the source S and the target element i estimated by the source location estimation unit 16; and $\hat{d}_0$ represents distance between the source S and the element 0 estimated by the source location estimation unit 16.

Therefore, the error $\Delta \tau|_i^{\theta_0}$ between the far-field 0-to-i delay and the near-field 0-to-i delay can be determined using the following formula:

$$\Delta \tau|_i^{\theta_0} = \frac{(\hat{d}_i - \hat{d}_0)}{c} - \frac{i\lambda \Delta e}{c}\cos(\hat{\theta}_0) \qquad (3)$$

Referring to FIG. 6, similarly an error $\Delta \tau|_i^{\theta_{L-1}}$ between far-field and near-field i-to-L-1 delays with respect to the elements i, L-1 can be determined using the following formula:

$$\Delta \tau|_i^{\theta_{L-1}} = \frac{(\hat{d}_i - \hat{d}_0)}{c} - \frac{i\lambda \Delta e}{c}\cos(\hat{\theta}_{L-1}) \qquad (4)$$

wherein $\hat{\theta}_{L-1}$ represents the direction of arrival estimated by the second DOA estimation unit 15 for the last element L-1 of the array 11.

The first sampler 12 uses the error $\Delta \tau|_i^{\theta_0}$ determined according to equation (3), and the second sampler 13 uses the error $\Delta \tau|_i^{\theta_{L-1}}$ determined according to equation (4), to correct sampling timing to follow the curve of the spherical wavefront. It should be noted that at the start of operations, the values $\Delta \tau|_i^{\theta_0}$, $\Delta \tau|_i^{\theta_{L-1}}$ are set to default values of zero.

The first DOA estimation unit 14 uses the output vectors from the first sampler 12 to produce an output covariance matrix $R_1$ for the first sub-array 11a resulting in:

$$R_1 = \vec{a}_1 \cdot \vec{a}_1^H + \begin{bmatrix} \delta_0^2 & & 0 \\ & \ddots & \\ 0 & & \delta_{Ls-1}^2 \end{bmatrix} \qquad (5)$$

wherein $\vec{a}_1$ represents the following steering vectors:

$$\left[1, e^{-j\frac{\omega}{c}(d_1-d_0)}, \ldots, e^{-j\frac{\omega}{c}(d_{Ls-1}-d_0)}\right]^T;$$

and $\{\delta_0, \delta_1, \ldots, \delta_{Ls-1}\}$ represents the noise variances at the elements of the first sub-array 11*a*.

Similarly, the second DOA estimation unit 15 uses the output vectors from the second sampler 13 to produce an output covariance matrix $R_2$ of the second sub-array 11*b* resulting in:

$$R_2 = \vec{a}_2 \cdot \vec{a}_2^H + \begin{bmatrix} \sigma_0^2 & & 0 \\ & \ddots & \\ 0 & & \sigma_{Ls-1}^2 \end{bmatrix} \quad (6)$$

wherein $\vec{a}_2$ represents the following steering vectors:

$$\left[1, e^{-j\frac{\omega}{c}(d_{L-Ls+1}-d_{L-Ls})}, \ldots, e^{-j\frac{\omega}{c}(d_{L-1}-d_{L-Ls})}\right]^T;$$

and $\{\sigma_0, \sigma_1, \ldots, \delta_{Ls-1}\}$ represents the noise variances at the elements of the second sub-array 11*b*.

The following explanation is a proof for showing that the first and second DOA estimation units 14, 15 will produce different output covariance matrices, and consequently will output different angles $\hat{\theta}_0$, $\hat{\theta}_{L-1}$. This proof follows the same strategy described by Pillai in "Array Signal Processing", Springer-Verlag 1989.

Assume that the first and second DOA estimation units 14, 15 produce the same output covariance matrices, so that $R_1 = R_2$. If the output covariance matrices $R_1$, $R_2$ are equal then:

$$\Delta R = \vec{a}_1 \cdot \vec{a}_1^H - \vec{a}_2 \cdot \vec{a}_2^H = \begin{bmatrix} \delta_0^2 - \sigma_0^2 & & 0 \\ & \ddots & \\ 0 & & \delta_{Ls-1}^2 - \sigma_{Ls-1}^2 \end{bmatrix} \quad (7)$$

Since $\vec{a}_1 \cdot \vec{a}_1^H$ and $\vec{a}_2 \cdot \vec{a}_2^H$ are both rank-one matrices, their difference $\Delta R$ is at maximum rank-two. Thus equation (7) can be reduced to:

$$\Delta R = \begin{bmatrix} \delta_0^2 - \sigma_0^2 & & & 0 \\ & \delta_1^2 - \sigma_1^2 & & \\ & & 0 & \\ & & & \ddots \\ 0 & & & 0 \end{bmatrix} \quad (8)$$

Partitioning the steering vectors as below:

$$\vec{a}_1 = \begin{bmatrix} \vec{a}_{11} \\ \vec{a}_{12} \end{bmatrix} = \begin{bmatrix} \left(1 \quad e^{-j\frac{\omega}{c}(d_1-d_0)}\right)^T \\ \left(e^{-j\frac{\omega}{c}(d_2-d_0)} \ldots e^{-j\frac{\omega}{c}(d_{Ls-1}-d_0)}\right)^T \end{bmatrix} \quad (9)$$

and $$\vec{a}_2 = \begin{bmatrix} \vec{a}_{21} \\ \vec{a}_{22} \end{bmatrix} = \begin{bmatrix} \left(1 \quad e^{-j\frac{\omega}{c}(d_{L-Ls+1}-d_{L-Ls})}\right)^T \\ \left(e^{-j\frac{\omega}{c}(d_{L-Ls+2}-d_{L-Ls})} \ldots e^{-j\frac{\omega}{c}(d_{L-1}-d_{L-Ls})}\right)^T \end{bmatrix} \quad (10)$$

It becomes clear that:

$$\vec{a}_{11} \cdot \vec{a}_{12}^H - \vec{a}_{21} \cdot \vec{a}_{22}^H = 0 \quad (11)$$

and $$\vec{a}_{12} \cdot \vec{a}_{12}^H - \vec{a}_{22} \cdot \vec{a}_{22}^H = 0 \quad (12)$$

Since each sub-array 11*a*, 11*b* has at least 3 elements, then $\vec{a}_{12} \neq 0$ and $\vec{a}_{22} \neq 0$, which in turn implies that $\vec{a}_{11} = \vec{a}_{21}$ and $\vec{a}_{12} = \vec{a}_{22}$. However, this is impossible unless the source is in the far field or in the end-fire of the array. In this way, the DOA estimation units 14, 15 use the first and last elements 0 and L-1 as referential elements to obtain different estimates of the source's DOA, that is, estimates of the angles $\hat{\theta}_0$, $\hat{\theta}_{L-1}$.

The source location estimation unit 16 introduces the angles $\hat{\theta}_0$, $\hat{\theta}_{L-1}$ from the DOA estimation units 14, 15 into the following formulas to estimate the distances $\hat{d}_i$, $\hat{d}_0$ between the source S and each of the elements 0 to L-1:

$$\hat{d}_0 = \frac{(L-1)\Delta e\lambda}{\left|\frac{\sin(\hat{\theta}_0)}{\cos(\hat{\theta}_{L-1})}\cos(\hat{\theta}_{L-1}) - \cos(\hat{\theta}_0)\right|} \quad (13)$$

and $$\hat{d}_{i>0} = \sqrt{\left(d_0\cos(\hat{\theta}_0) + i\Delta e\lambda\right)^2 + \left(d_0\sin(\hat{\theta}_0)^2\right)} \quad (14)$$

wherein i represents the target element of sampling from elements 0 to L-1;

$\hat{d}_0$ represents distance between the source S and the element 0 estimated by the source location estimation unit 16;

$\lambda\Delta e$ represents inter-element distance;

$\hat{\theta}_0$ represents direction of arrival estimated for the element 0 by the first DOA estimation unit 14;

$\hat{\theta}_{L-1}$ represents direction of arrival estimated for the element L-1 by the second DOA estimation unit 15; and $\hat{d}_i$ represents distance between the source S and the target element i estimated by the source location estimation unit 16.

The samplers 12, 13 compute sampling rules for the elements of each sub-array 11*a*, 11*b* based on the values derived from equations (3), (4), (13), and (14). The source location estimation device recursively applies these algorithms, each time enhancing the source location estimation.

When no significant variation can be observed between the angles $\hat{\theta}_0$, $\hat{\theta}_{L-1}$, this means that the distance estimates $\hat{d}_i$, and $\hat{d}_0$ have approached the true values of distance $\hat{d}_i$ and the adaptively sampled steering vectors $\vec{a}_1$ will have the form:

$$\vec{a} \cong \left[1 e^{-j2\pi\Delta e\cos(\theta_0)} \ldots e^{-j2\pi\Delta e(Ls-1)\cos(\theta_0)}\right]^T \quad (15)$$

This is exactly the same as a conventional far field steering vector, which means that the adaptive sampling scheme actually removes the near field distortion and indeed allows for the conventional far field DOA estimation algorithms to obtain accurate estimates of $\hat{\theta}_0$ and $\hat{\theta}_{L-1}$, and therefore the correct source location.

In this way, the samplers 12, 13 perform sampling at the elements separately for each sub-array 11*a*, 11*b*. The first and second DOA estimation units 14, 15 use the two sets of sampling results to perform two separate source location estimations. The source location estimation unit 16 uses the difference between the source location estimations of the sub-arrays (b-arrays) to adaptively modify the sampling rules for the elements of the two sub-arrays 11a, 11b. Each iteration relies on a simple search of angles, not distances, so each search is limited to the interval between 0 (0 degrees) and π (180 degrees). The device can operate in a situation where both near field and far field signals coexist.

The inventor performed a simulation of the device according to the present embodiment. In the simulation, the array antenna had eight elements divided into two 7-element sub-arrays. The MUSIC algorithm was used for DOA estimations. The simulation was run to locate a source in the near field at coordinates (1,2) with respect to the center of the array. The results of the simulation are shown graphically in FIGS. 7 to 10.

Figure 7:
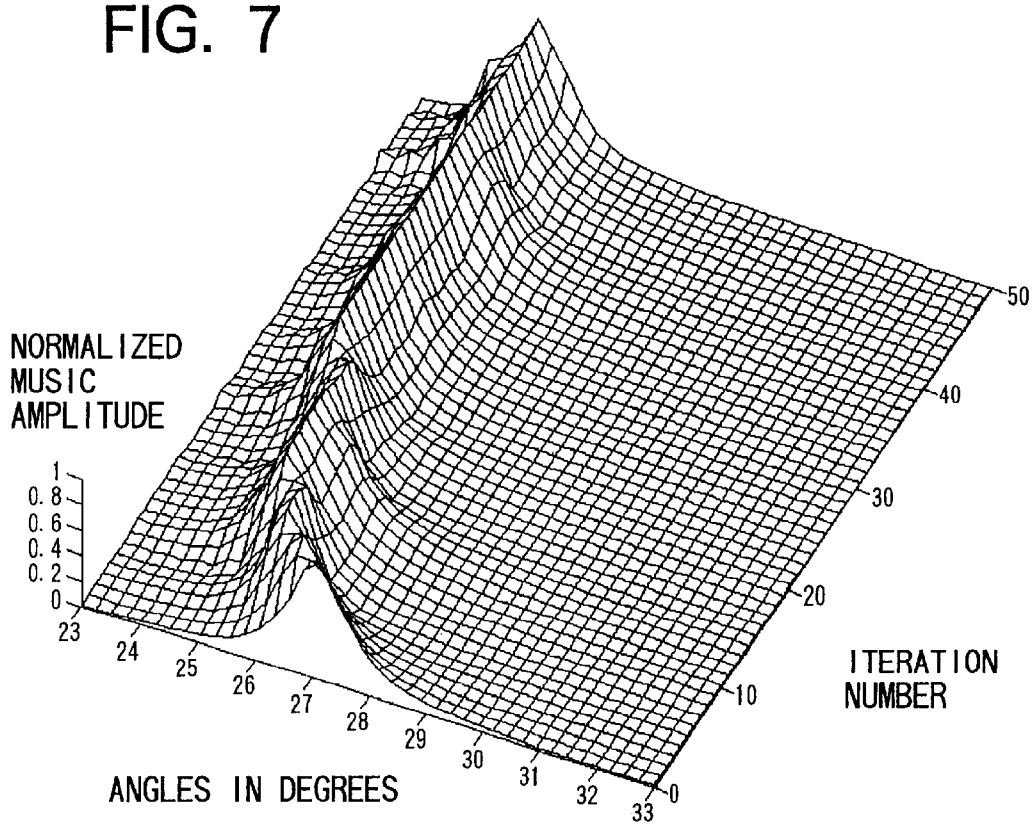
FIG. 7 is a graphical representation of a simulation of the device locating a source in the near field, showing changes in the MUSIC spectrum of the first sub-array over 50 iterations.
Figure 8:
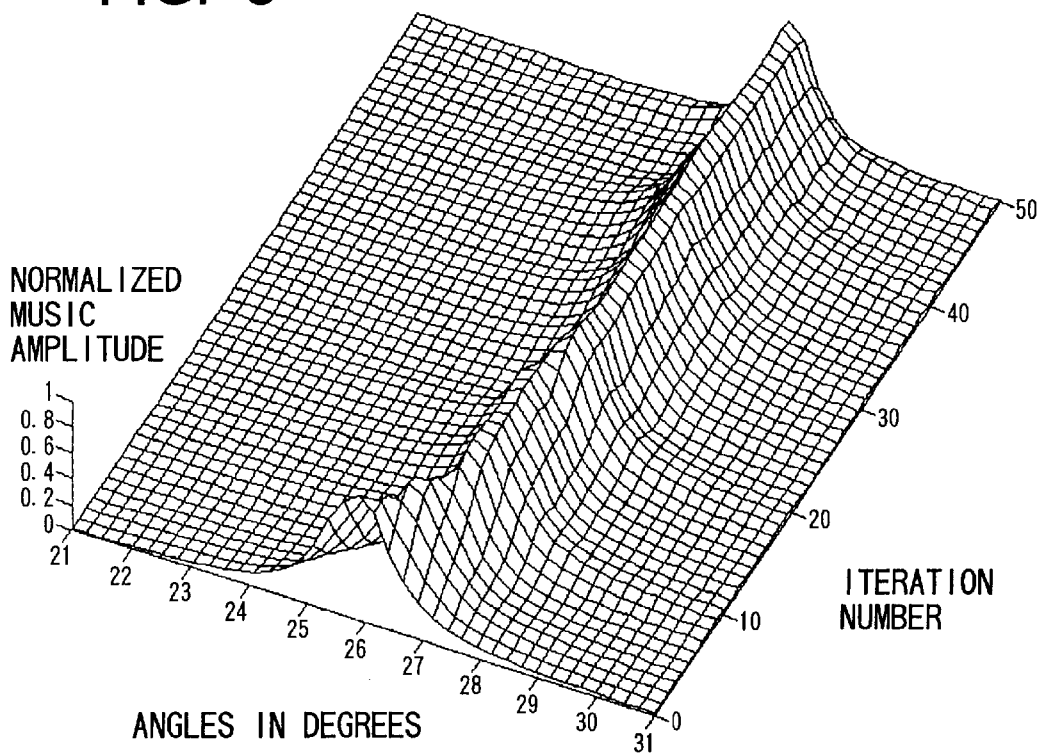
FIG. 8 is a graphical representation of the simulation results, showing changes in the MUSIC spectrum of the second sub-array over 50 iterations.

As can be seen, the angle estimates obtained for each sub-array are corrected quite rapidly. That is, FIG. 7 shows that the angle estimate for the first sub-array is corrected from about 27° to about 25° after about 10 iterations, and to 24° after about 25 iterations. FIG. 8 shows that the angle estimates for the second sub-array is corrected from about 25.5° to 26° after about 10 iterations, and to 27° after about 20 iterations.

Figure 9:
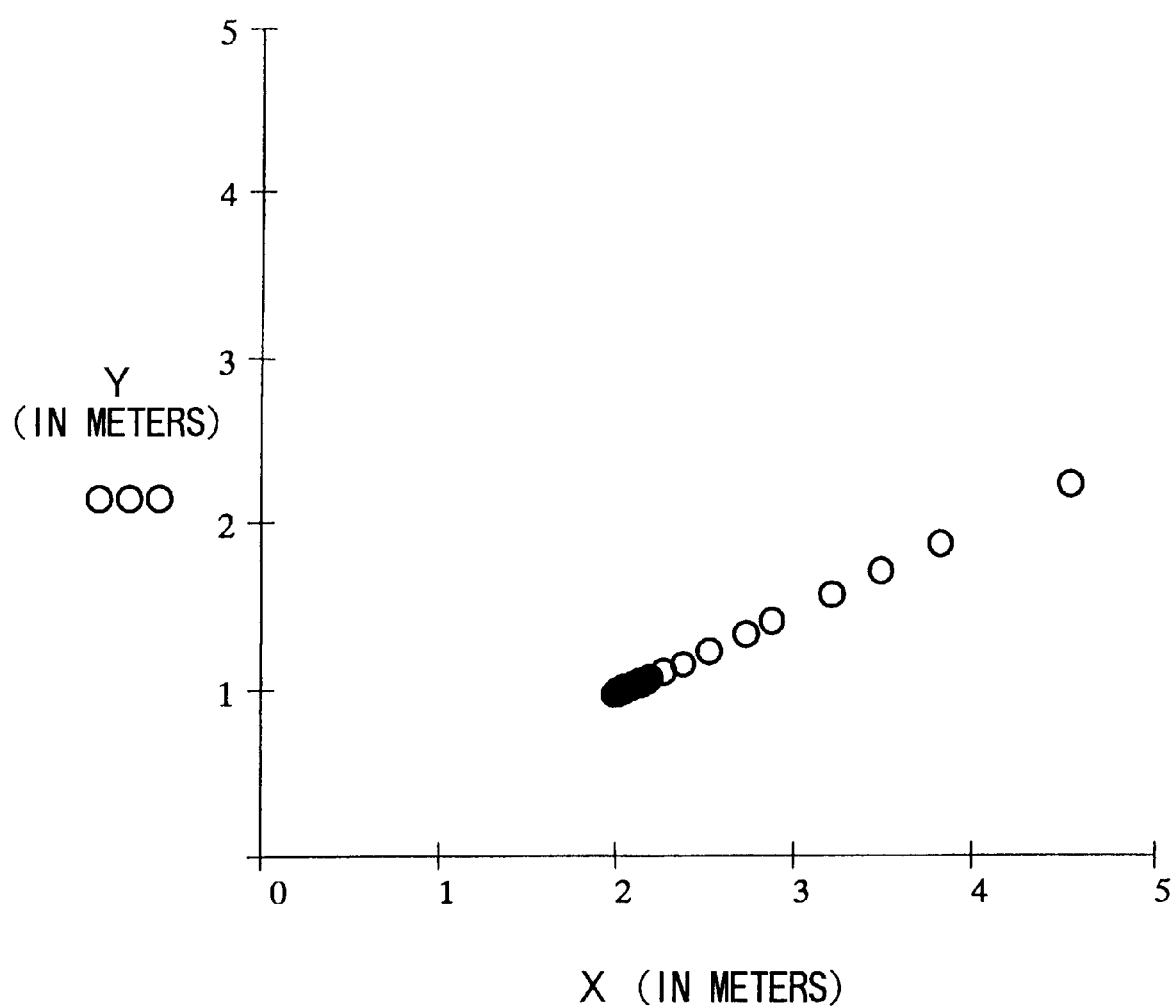
FIG. 9 is a graphical representation of the simulation results, showing estimations of the source's coordinates in successive iterations
Figure 10:
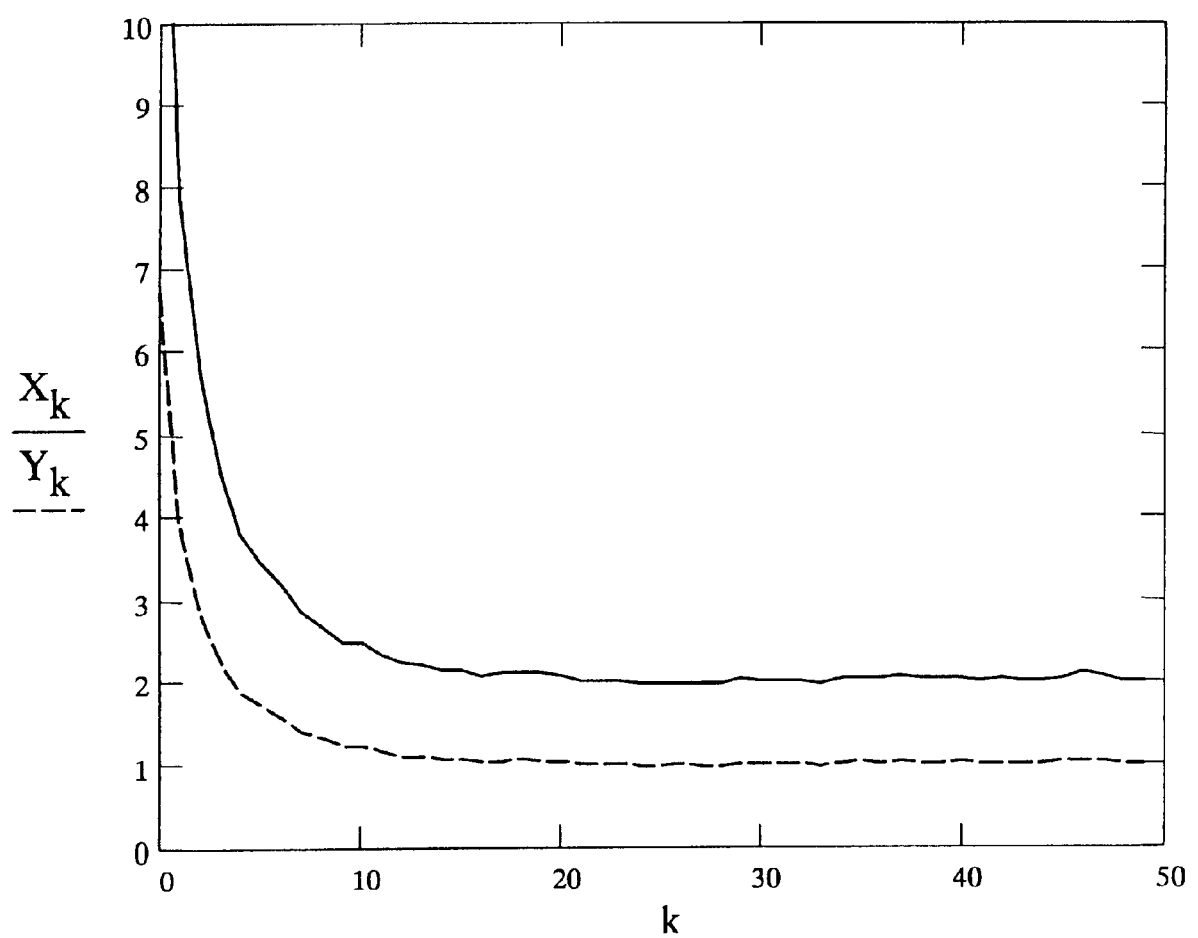
FIG. 10 is a graphical representation of the simulation results, showing estimations of the source's location in successive iterations.

FIG. 9 is a graph showing estimations of the source's coordinates in successive iterations. As can be seen, the source location, that is, coordinates (1,2), could be obtained quite precisely. FIG. 10 is a graph showing source location over several iterations, wherein estimated X coordinates are indicated in solid line and Y coordinates are indicated in broken line. As can be seen, the values of X and Y coordinates remained fairly stable after about 15 iterations. This lack of change shows that the values $d_i$ and $d_0$ in equations (2), (3), and (4) have converged, and canceled each other out, so that the incoming signal can be treated as though it were a plane wavefront.

When multiple sources are present, source locations identified by the sub-arrays must be properly associated with the corresponding sources. This can be accomplished using a variety of different methods, such as spectrum matching, power relations, and training sequences. Since different sources are located in different places, an adaptive sampler must be provided for each sub-array for each detected source. For example, four samplers are required two detected sources, six samplers for three sources, and so on.

The source location precision will mostly depend on two factors:

a) The DOA Estimation Algorithm

The performance of the present invention varies fairly closely with the quality of the estimated DOAs, because only a pair of DOAs $\hat{\theta}_0$ and $\hat{\theta}_{L-1}$ is used to locate the source, and because the sampling rules are constructed with basis on such information.

b) The Source-to-array Distance Against the Array Size.

The more elements in the sub-arrays, the greater the precision of estimates. Also, the closer the source is to the array, the greater the difference between the estimated angles $\hat{\theta}_0$ and $\hat{\theta}_{L-1}$ from the DOA estimation units 14, 15. As a result, closer sources can be located with higher precision. Of course, if the source is in the far field, range information is not relevant.

Convergence speed also depends on the source-to-array distance against the array size. When the sub-arrays overlap, the convergence speed further depends on the ratio between sub-array size and total array-size. This ratio needs to be taken into consideration when designing an array according to the present invention, because the amount of overlap involves a trade off between convergence speed and precision during convergence. The trade off is a direct consequence of equations (11) and (12).

That is, when the ratio between sub-array size and total array-size is low, little overlapping occurs, which in turn results in better isolation between the two estimates from the DOA estimations units. When isolation is high, convergence is faster. However, because each sub-array includes fewer of the total elements, the DOA estimates will be less precise.

On the other hand, when the ratio is high, the isolation between the DOA estimates from the DOA estimations units 14, 15 is lower, causing equations (11) and (12) to hold, especially under noisy conditions.

However, the final result of the source location is ultimately only dependent on the estimation of the angles $\hat{\theta}_0$ and $\hat{\theta}_{L-1}$ shown in FIGS. 5 and 6. Since these are the DOA angles at the first and last elements, the final performance of the array according to the present invention is related only to the total number of elements in the array.

Figure 11:
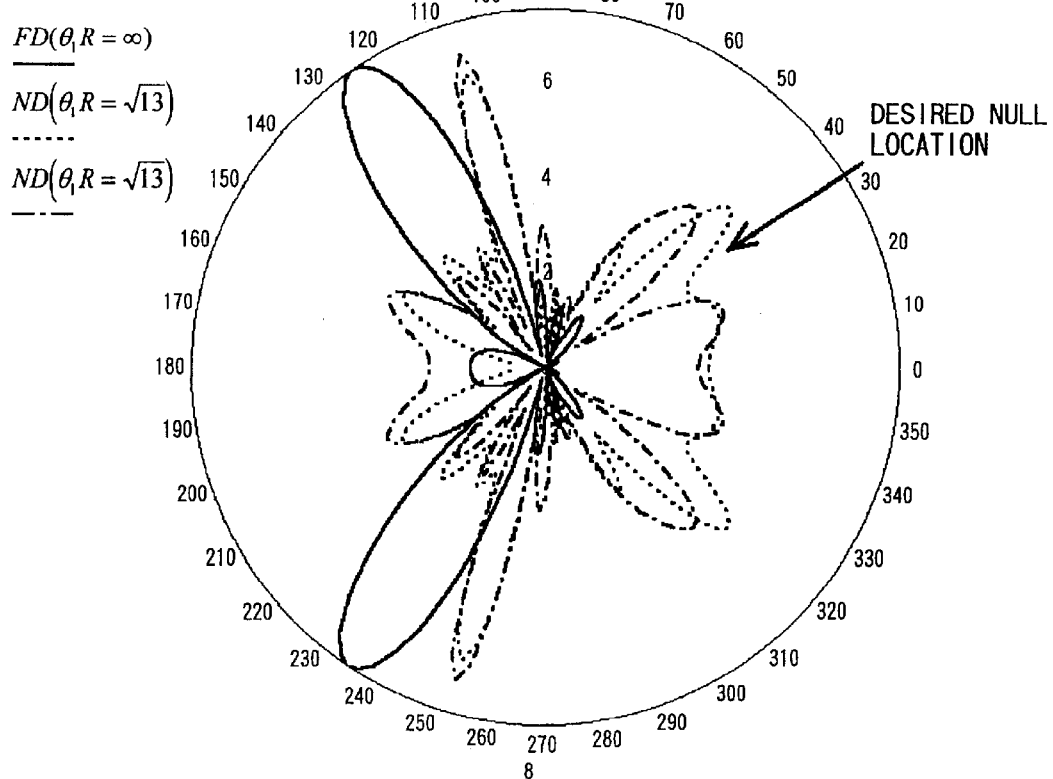
FIG. 11 is a graphical comparison of null steering beam patterns achieved under far field conditions, under near field conditions without compensation, and under near field conditions with compensation based on source estimation according to the present invention.
Figure 12:
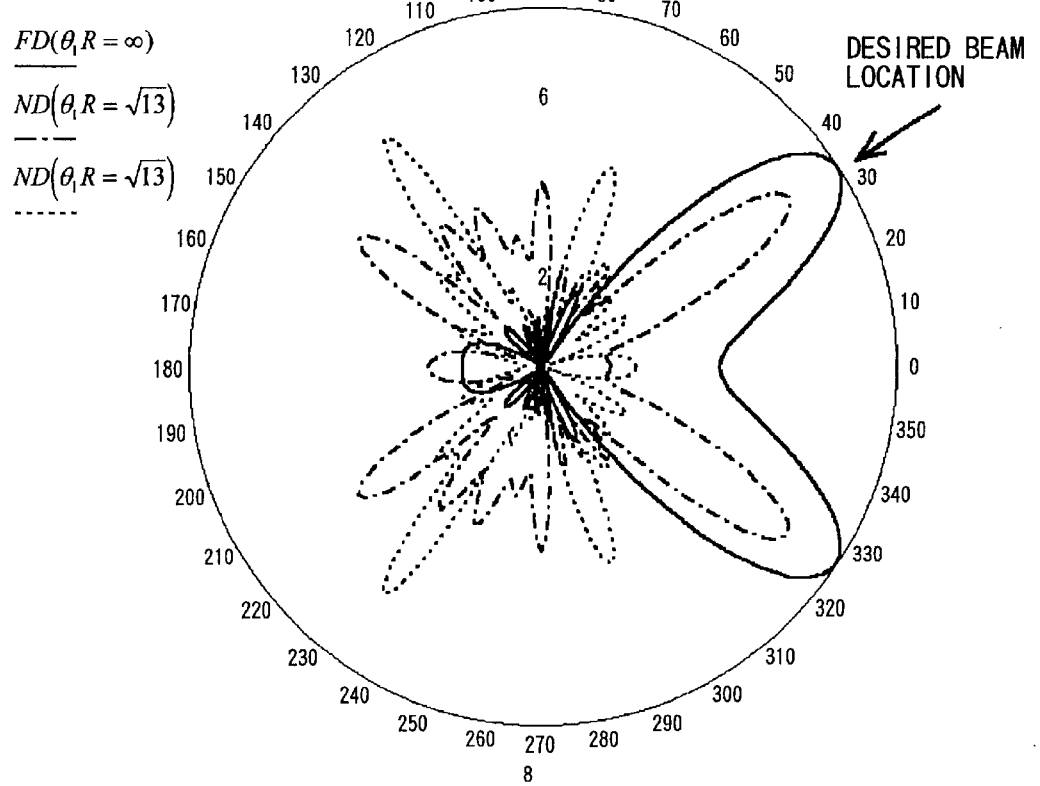
FIG. 12 is a graphical comparison of beam steering beampatterns achieved under the same conditions described for FIG. 11.

FIGS. 11 and 12 show a comparison of beam patterns designed for a source at coordinates (3m, 2m), which is equivalent to 33.7°. In FIGS. 11 and 12, solid line represents a beam pattern achieved for a far field source, dotted line represents a beam pattern achieved for a near field source without compensation, and single-dot chain line represents a beam pattern achieved for a near field source with compensation based on source estimation according to the present invention.

As shown in FIG. 11, when the source is in the near field, null steering performed based on the present invention locates a null much more accurately than when no compensation is performed. Furthermore, the intensity of the null nearly matches that of the null achieved for a far field source.

As shown in FIG. 12, when the source is in the near field, beam steering performed based on the present invention locates a beam where desired with greater intensity than when no compensation is performed. Furthermore, the intensity of the beam nearly matches that of the beam produced when the source is in the far field.

The present invention can be effectively applied to a wide range of communication and multimedia systems that are subject to the problem of spatial signal separation that occurs when array antennas are used under near-field propagation conditions. Examples of such systems include microphone arrays that use array antennas for voice or music signal separation, and indoor local area networks (LAN) that use array antennas for network access.

The present invention is particularly relevant to indoor LANs. Currently great efforts are being made to deploy the worldwide-available 2.4 GHz band for indoor LANs. The near-field distortion when array antennas are used indoors for communication on the 2.4 GHz band is particularly striking. Smart antennas with near-field compensation according to the present invention will enable conventional far-field algorithms to be applied to indoors wireless LAN systems.

The present invention can benefit indoors wireless LAN systems mainly in the three areas of implementation, mobility, and capacity.

A network according to the present invention can be implemented less expensively, and with greater flexibility. Normally the optimum access point location must be determined, usually by exhaustive simulations with ray-tracing. However, there is no need to determine optimum access point location when a smart antenna according to the present invention is used at the access point. That is, when the base station of an indoor LAN is equipped with a smart antenna with near-field compensation according to the present invention, the base station can automatically and adaptively acquire the spatial signature of each terminal and selectively beam form towards them for both transmission and reception. This alternative has not been available up to now because array antennas have not be sufficiently robust under near-field conditions.

The large number of multipath propagation components in indoor situations causes severe fading in indoor channels.

This severe fading makes it difficult to maintain a proper connection between a base station and a mobile terminal in the indoor situation. A base station according to the present invention provides improved mobility because it can track the movement of mobile terminals while also steering beamforming that is performed at the mobile terminals. The base station needs to acquire the spatial signature (radiation pattern) of a mobile terminal for the downlink, that is, when base station transmits and the portable terminal receives. The downlink is the most important, because downlink has typically much higher traffic. No practical methods are available for the downlink in indoor situations because available methods can not acquire an accurate spatial signature for mobile terminals in indoor situations. However, the system according to the present invention can acquire the spatial signature of the mobile terminal because of its ability to compensate for near-field distortion.

Capacity can be improved if the beamforming process (in both up and downlink) is precise enough to allow separation among the terminals, like in a SDMA system. The system according to the present invention can enhance precision on the spatial signature acquisition process by canceling near-field distortion. Therefore, it can contribute to the practical implementation of SDMA technique to the indoor wireless LAN systems.

While the invention has been described in detail with reference to specific embodiments thereof, it would be apparent to those skilled in the art that various changes and modifications may be made therein without departing from the spirit of the invention, the scope of which is defined by the attached claims.

For example, although the embodiment described the present invention applied to a uniform linear array, the present invention could be applied to any type of array antenna with equal effectiveness, as long as positioning and inter-element distances of the elements are known.

Also, the present invention can use any DOA estimation algorithm.

Also, as shown in FIG. 3, demodulation/decorrelation units 20a, 20b can be optionally provided for demodulating and down-converting signals received from the sub-arrays 11a, 11b, respectively.

The embodiment describes using the first and last elements of the array as referential (pivot) elements. However, any other pair of elements can be used as referential elements. It should be noted that the first and last elements will always be uncommon for each sub-array and are further apart from each other than any other pair of elements. Therefore, the first and last elements are the optimum elements, so provide the best results.

What is claimed is:

1. A source location estimation device, comprising:
an array antenna including two sub-arrays, each sub-array having at least three elements with at least one unshared element;
a first sampler for sampling elements of one sub-array;
a second sampler for sampling elements of the other sub-array;
a direction-of-arrival estimator for using samples from the samplers to make a separate direction-of-arrival estimate for each sub-array for direction of arrival of a signal from a source;
a source location estimator for estimating distances from the source to each element based on the separate direction-of-arrival estimates from the direction-of-arrival estimator; and
a sampling adjuster for adjusting timing of sampling performed by the samplers based on the distances from the source location estimator.

2. A source location estimation device as claimed in claim 1, wherein the sampling adjuster adjusts timing of sampling by the first sampler based on the following formula:

$$\Delta\tau\big|_i^{\theta_0} = \frac{(\hat{d}_i - \hat{d}_0)}{c} - \frac{i\lambda\Delta e}{c}\cos(\hat{\theta}_0)$$

wherein i represents the target element of sampling from elements 0 to L-1, elements 0 and L-1 being optimum referential elements of the one and the other sub-array, respectively;

$\Delta\tau\big|_i^{\theta_0}$ represents error between far-field delay and near-field delay with respect to the element 0 and the target element;

$\hat{d}_i$ represents distance between source and the target element estimated by the source location estimator;

$\hat{d}_0$ represents distance between source and the element 0 estimated by the source location estimator;

c represents the speed of light;

$\lambda\Delta e$ represents inter-element distance; and $\hat{\theta}_0$ represents direction of arrival estimated for the element 0 of the one sub-array by the direction-of-arrival estimator;

and the sampling adjuster adjusts timing of sampling by the second sampler based on the following formula:

$$\Delta\tau\big|_i^{\theta_{L-1}} = \frac{(\hat{d}_i - \hat{d}_0)}{c} - \frac{i\lambda\Delta e}{c}\cos(\hat{\theta}_{L-1})$$

wherein $\Delta\tau\big|_i^{\theta_{L-1}}$ represents error between far-field delay and near-field delay with respect to the element L-1 and the target element; and $\hat{\theta}_{L-1}$ represents direction of arrival estimated for the element L-1 by the direction-of-arrival estimator.

3. A source location estimation device as claimed in claim 1, wherein:
the array antenna includes elements 0 to L-1 for a total of L elements;
one sub-array includes elements 0 to $L_s$-1, wherein $L_s$<L, element 0 being an optimum referential element of the one sub-array;
the other sub-array is obtained by a shift of L-Ls elements, and so includes elements L-$L_s$ to L-1, element L-1 being an optimum referential element of the other sub-array; and
the source location estimator estimates distances between the source and each of the elements 0 to L-1 based on the following formulas:

$$\hat{d}_0 = \frac{(L-1)\Delta e\lambda}{\left|\frac{\sin(\hat{\theta}_0)}{\cos(\hat{\theta}_{L-1})}\cos(\hat{\theta}_{L-1}) - \cos(\hat{\theta}_0)\right|}$$

and $$\hat{d}_{i>0} = \sqrt{(d_0\cos(\hat{\theta}_0) + i\Delta e\lambda)^2 + (d_0\sin(\hat{\theta}_0))^2} \qquad (14)$$

wherein i represents a target element of sampling from elements 0 to L-1;

$\hat{d}_0$ represents distance between the source and the element 0 estimated by the source location estimator;

$\lambda\Delta e$ represents inter-element distance;

$\hat{\theta}_0$ represents direction of arrival estimated for the element 0 by the direction-of-arrival estimator;

$\hat{\theta}_{L-1}$ represents direction of arrival estimated for the element L-1 by the direction-of-arrival estimator; and $\hat{d}_i$ represents distance between the source and the target element estimated by the source location estimator.

4. A source location estimation device as claimed in claim 1, further comprising a beamformer for performing beamforming based on the distances estimated by the source location estimator.

5. A source location estimation device as claimed in claim 4, wherein the beamformer tracks the movement of a mobile terminal while also steering beamforming that is performed at the mobile terminal.

6. A source location estimation method, comprising the steps of:

sampling elements of two sub-arrays having at least three elements each, wherein at least one element of each sub-array is unshared with the other sub-array;

using sampling results to make a separate direction-of-arrival estimate for each sub-array for direction of arrival of a signal from a source;

estimating distances from the source to each element based on the separate direction-of-arrival estimates; and adjusting timing of sampling of the elements based on the distances.

\* \* \* \* \*